United States Patent [19]

Kisler et al.

[11] Patent Number: 5,049,404
[45] Date of Patent: * Sep. 17, 1991

[54] METHOD AND APPARATUS FOR APPLYING ULTRA-THIN COATINGS TO A SUBSTRATE

[75] Inventors: Semyon Kisler, Needham; William J. Timson, Belmont; John E. Tremblay, Burlington, all of Mass.

[73] Assignee: Polaroid Corporation, Cambridge, Mass.

[*] Notice: The portion of the term of this patent subsequent to May 2, 2006 has been disclaimed.

[21] Appl. No.: 282,011

[22] Filed: Dec. 9, 1988

Related U.S. Application Data

[63] Continuation of Ser. No. 32,606, Apr. 1, 1987, abandoned.

[51] Int. Cl.⁵ .................... B05D 1/04; B05B 5/035
[52] U.S. Cl. ........................... 427/30; 427/32; 427/57; 118/626; 118/630
[58] Field of Search ............... 427/13, 25-33, 427/57; 239/690, 699, 3; 118/621, 626, 627, 629, 630

[56] References Cited

U.S. PATENT DOCUMENTS

| | | | |
|---|---|---|---|
| 2,685,536 | 8/1954 | Starkey et al. | 117/93 |
| 2,826,513 | 3/1958 | Blanchard | 427/28 |
| 2,881,092 | 4/1959 | Sedlacsik, Jr. | 427/30 |
| 2,893,894 | 7/1959 | Ransburg | 117/93 |
| 2,952,559 | 9/1960 | Nadeau | 427/32 |
| 3,114,654 | 12/1963 | Nishiyama et al. | 118/627 |
| 3,186,864 | 6/1965 | Pettigrew et al. | 118/627 |
| 3,198,170 | 8/1965 | Onishi | 118/627 |
| 4,088,093 | 5/1978 | Pan | 427/32 |
| 4,457,256 | 7/1984 | Kisler et al. | 118/621 |
| 4,826,703 | 5/1989 | Kisler | 427/14.1 |

FOREIGN PATENT DOCUMENTS 37-18621 12/1962 Japan .................... 427/30

*Primary Examiner*—Evan Lawrence
*Attorney, Agent, or Firm*—John J. Kelleher

[57] ABSTRACT

An electrostatic coating method and apparatus are provided that are capable of applying an extremely thin and virtually constant thickness coating to a substrate, and includes a coating applicator having an opening formed of dielectric material through which coating material flows for coating purposes. The coating material supplied to the applicator is pressurized to maintain a substantially constant volume of coating material at the applicator opening output and is vibrated in the vicinity of the applicator opening to provide a uniform flow of coating material to the applicator output, to stabilize the shape of the coating material at the applicator output and to preclude changes in coating material flow rate caused by electrostatic field induced coating material dryout. An electrostatic field of predetemined magnitude is established between the coating material surface and the adjacent substrate to thereby extract minute, uniform size particles from coating material at the applicator opening and subsequently deposit an ultra-thin layer of these particles on the adjacent substrate as the substrate moves past the applicator opening. In dielectric substrate coating applications where a relatively thick coating layer is required, an electrostatic charge is established on the dielectric substrate, at a remote location, before the substrate is coated in order to neutralize the electrostatically charged coating material so that such coatings can be electrostatically applied.

14 Claims, 1 Drawing Sheet

METHOD AND APPARATUS FOR APPLYING ULTRA-THIN COATINGS TO A SUBSTRATE

This is a continuation of application Ser. No. 032,606, filed Apr. 1, 1987, now abandoned.

BACKGROUND OF THE INVENTION

The present invention relates to a method and apparatus for applying a layer of coating material to a substrate and, more particularly, to a method and apparatus for applying a thin, virtually constant thickness coating to a substrate.

In many coating applications, extremely thin, constant thickness coatings are absolutely essential in order to avoid degrading the performance of the coated device and/or the equipment with which such coatings are utilized. In, for example, audio and video magnetic tapes, if the magnetic media coating is excessively thick or there are significant variations in coating thickness, magnetic coupling and therefore information transferal between the magnetic media in the coating and, for example, a read/write head of audio or video recording or reproducing equipment in which the tape is utilized could be substantially degraded because of the increased spacing or the spacing variations between these components that necessarily result when such coatings are employed.

A number of coating techniques presently exist for applying coating materials to a web or other object surface. Many of these techniques employ an electrostatic field between the coating applicator and the web or object surface to assist in both the uniform and efficient deposition of coating materials on such surfaces. In, for example, the well-known process of electrostatic spray painting, an electrostatic field is established between an electrically conductive grid and a particular metal object to be painted. The electrostatic field is created by a relatively high dc voltage (100,000 V) connected between grid and object, with the object ordinarily being spaced several feet from the grid. Air pressure supplied to a reservoir of coating fluid coupled to one or more orifices in the coating applicator causes coating fluid droplet formation at the output of each of said coating applicator orifices. The droplets are subsequently propelled into the grid by air pressure generated forces where they become electrostatically charged and then deposited, in layer form, on a surface of said particular object by forces associated with the electrostatic field. Unfortunately, due to the relatively large droplet size generated by this type of coating apparatus, the resulting coating layers are well in excess of a thickness level that would avoid the above-mentioned problem associated with excessively thick magnetic media coatings.

Electrostatic coating apparatus capable of generating and subsequently depositing relatively small coating material particles on a substrate has been described in the patent literature. In W. A. Starkey et al U.S. Pat. No. 2,685,536, for example, a method and apparatus for electrostatically coating articles are disclosed wherein coating material is supplied to the orifice of a coating applicator and an electrostatic field is established between the surface of the coating material and a surface of the article to be coated. As described therein, the coating material oozes through applicator orifices where it is then divided into fine particles by forces associated with the electrostatic field. The finely divided particles are then transported to the surface of the article by forces associated with the same electrostatic field.

It can be demonstrated that the rate of electrostatic field generated, coating material particle movement toward a surface to be coated in, for example, the above-noted STARKEY ET AL apparatus, is dependent, in part, upon the intensity of the electrostatic field. Therefore, variations in electrostatic field intensity when coating, for example, a moving web will produce corresponding variations in the thickness of an electrostatically deposited coating layer. It is well known that the intensity of an electrostatic field established between a pair of electrodes spaced a fixed distance from one another is very much dependent upon the shape of the electrode ends between which the electric field is established. The smaller the radius of curvature at the end of an electrode, for example, the greater will be the electrostatic field intensity in the vicinity of the small radius of curvature electrode for any particular electrode-to-electrode voltage. Variations in electrode shape, therefore, can produce corresponding variations in an electrostatic field in the vicinity of the electrode surface where the shape is varying.

If, for example, the external surface of coating material oozing through an applicator opening in FIG. 2 of STARKEY ET AL, is considered to be an end of an electrically conductive electrostatic field generating electrode, variations in the shape of this external coating material will produce variation in an electrostatic field in the vicinity of said coating material surface and corresponding variations in the thickness of coating material being atomized and deposited on a surface by such a varying electrostatic field. Such surface shape variations can be caused by any number of different factors. One factor is the pressure variations that are necessarily produced when a mechanical pump is is employed to pressurize coating material supplied to the coating applicator. Another factor could be the presence of air bubbles entrained within the coating material. These bubbles would momentarily disturb or change the external surface shape of the coating material when passing through an applicator orifice. Yet another factor might be changes in the coating surface shape that may result as coating material particles are electrostatically extracted from said coating surface during the coating process. Each of these electrostatic field intensity altering factors can produce variations in web coating layer thickness.

Also, the electrostatic coating apparatus described in STARKEY ET AL is employed where the object to be coated is itself electrically conductive. In such an arrangement, the ability to coat a particular object is primarily dependent upon the ability to establish an electrostatic field of sufficient intensity between the coating applicator and a surface of the object to be coated to both atomize the coating material particles and then transport same to said object surface. However, this type of coating apparatus is relatively ineffective when employed to coat insulative materials, such as a dielectric web, because the electrostatic field needed to coat such materials is significantly attenuated by the dielectric web. Present practice is to overcome this problem by coating the web with an electrode forming layer of electrically conductive material and then electrostatically coat this layer with the preferred or final layer of coating material. Unfortunately, this technique both increases the cost of coating a web and adds the characteristics of the conductive layer to that of the coated web which may prevent its subsequent use in many coated web applications.

In addition, it can readily be demonstrated that fluids are dried by or have moisture removed from them when exposed to an electrostatic field. If coating material flow rates are in the near-zero flow rate range, as in the STARKEY ET AL patent, the external surface of the coating material at the coating applicator orifices or outputs may dry out or coagulate due to the presence of an electrostatic field at said coating material surfaces and thereby block or substantially reduce the flow of coating material through each coating applicator orifice, within a relatively short period of time. A flow rate change of this type would also produce detrimental variations in web coating layer thickness.

It is a primary object of the present invention, therefore, to provide coating apparatus that is capable of applying a relatively thin, virtually constant thickness layer of coating material to a substrate.

It is another object of the present invention to provide extremely low flow rate coating apparatus having a flow rate that will remain fairly constant for an extended period of time.

It is a further object of the present invention to provide low flow rate coating apparatus that is capable of properly functioning within an electrostatic field for an extended period of time.

An advantage of the present invention is the ability of the coating apparatus employed therein to apply coating materials having significantly greater conductivity than that of coating materials presently applied by conventional electrostatic coating techniques.

Other objects, features and advantages of the present invention will be readily apparent from the following detailed description of a preferred embodiment thereof taken in conjunction with the accompanying drawings.

SUMMARY OF THE INVENTION

In accordance with the present invention, a low flow rate coating method and apparatus are disclosed that are capable of depositing relatively thin, virtually constant thickness coatings on a substrate. The method and apparatus include a coating applicator coupled to a source of coating material having an opening therein formed of a dielectric material through which coating material flows for substrate coating purposes. Means are provided for forming a substantially unvarying shape on the surface of that portion of the coating material at said applicator opening, during the entire coating process. The substrate is supported in a spaced relation from the output of the coating applicator to thereby form a coating gap between the coating applicator output and said substrate. Means are provided for establishing an electrostatic field in said coating gap between said coating material surface and the substrate spaced therefrom to thereby atomize or extract coating material particles from said coating material surface and subsequently transport said particles to the substrate. Means are also provided for moving the substrate at a constant rate through said coating gap whereby a relatively thin, uniform thickness layer of coating material is deposited on said substrate. In dielectric web coating applications where a relatively thick layer of coating material is required, an electrostatic charge is established on the dielectric web at a location remote from the coating applicator, before being moved past the coating applicator opening, in order to neutralize electrostatic charges present in the initial portion of the coating layer that would otherwise interfere with (repel) a subsequently deposited portion of the same layer necessarily having the same charge polarity.

DESCRIPTION OF THE PREFERRED EMBODIMENTS

The coating apparatus of the present invention is capable of coating conductive as well as insulative or high dielectric substrates. Presently available electrostatic coating apparatus such as that described in Ransburg U.S. Pat. No. 2,893,894 can readily coat conductive substrates with relatively thick coatings, but are relatively ineffective in coating dielectric substrates. Inasmuch as the more difficult task is that of coating dielectric substrates, the coating apparatus to be described below is primarily directed to apparatus for coating such substrates. However, this apparatus may be employed to coat conductive substrates, also.

Figure 1:
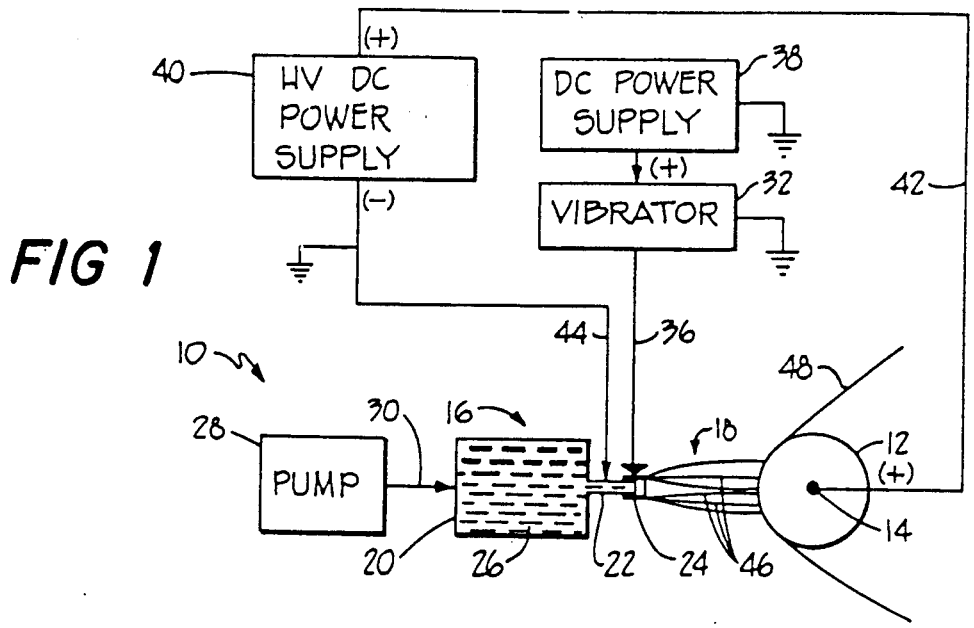
FIG. 1 is a diagrammatic illustration of a web coating arrangement employing a preferred embodiment of the coating method and apparatus of the present invention.

Turning now to FIG. 1 of the drawings, there is shown a diagrammatic illustration of web coating apparatus 10 employing the relatively thin, virtually constant thickness coating method and apparatus of the present invention. As shown in said FIG. 1, coating apparatus 10 includes cylindrically shaped and electrically conductive backing roll 12 that is mounted for rotation about backing roll axis 14. Apparatus 10 also includes extrusion-type coating applicator 16 mounted in a fixed position with respect to said backing roll axis 14 and spaced from the cylindrical surface of backing roll 12 by the gap 18.

Figure 2A:
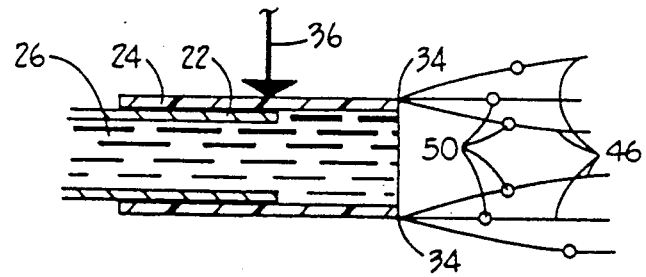
FIG. 2A is primarily a side elevational view of an enlarged detail of the dielectric output end of the coating applicator nozzle shown in drawing FIG. 1.

Coating applicator 16 comprises pressurizable coating material vessel 20 having electrically conductive nozzle 22 projecting through a wall thereof and having dielectric tube or sleeve 24 slidably mounted on its external surface with an end of said tube extending beyond the end of said nozzle 22. The term "dielectric" as employed herein means a material having a resistivity equal to or greater than $10^9$ ohms per square. Nozzle 22 is formed of stainless steel, is of circular cross-section and has a coating material 26 conducting circular opening through the center thereof that is 0.075 inch in diameter. Dielectric tube 24 is of circular cross-section and is formed of polytetrafluorethylene having a tube wall thickness of 0.10 inch with its circular opening having a diameter of 0.030 inch. The free end of dielectric tube 24 preferably extends approximately 0.25 inch beyond the end of conductive nozzle 22. As shown in FIG. 2A, the free end of dielectric tube 24 is truncated or cut at 90° or at a right angle with respect to the longitudinal axis of or the principal direction of coating material flow through the center of said tube 24. However, acceptable thin coatings may also be obtained when the free end of tube 24 is cut at an angle other than 90°. Pump 28, coupled to vessel 20 through path 30, pressurizes coating material 26 within said vessel 20 to a pressure level that will produce the desired coating material 26 flow rate through applicator nozzle 22 and dielectric tube 24. Pump 28 includes a conventional pump pressure regulator (not shown) to mechanically limit, to the extent possible, fluctuations in the output pressure of said pump 28 and coating material 26 within applicator 16 coupled thereto. Pressure generated by pump 28 is ideally adjusted to a level that will maintain a substantially constant or unvarying volume of coating material 26 at the output end of dielectric tube 24 or at that end of tube 24 extending beyond the output end of electrically conductive nozzle 22 as best shown in drawing FIG. 2A.

With reference to both FIGS. 1 and 2A, mechanical vibrator 32 is provided whose primary function is to insure that a uniform flow of coating material 26 is supplied to outer edge 34 (FIG. 2A) of dielectric tube 24. Mechanical vibrator 32 is of conventional design and is preferably of the type whose vibration amplitude can be selectively adjusted and whose vibration frequency can be varied over a range of from 5 to 10,000 Hz with its vibrating member being coupled to dielectric tube 24 through path 36. Vibrator 32 is electrically powered with its operating power being derived from dc power supply 38. Forces applied to dielectric tube 24 by vibrator 32 must be applied in a direction that is transverse of the principal direction of coating material 26 flow through said tube 24 and preferably at a right angle thereto in order to produce thin web surface coatings. Forces in the direction of such coating material flow of a magnitude sufficient to alter the flow rate of coating material 26 to edge 34 of dielectric tube 24 would cause variations in coating thickness by coating apparatus 10 for reasons to be explained below. Applying a component part of a transverse vibrator 32 force in the principal direction of coating material 26 flow through tube 24 would be acceptable so long as the force level does not adversely affect the flow rate of coating material 26 to edge 34 of said tube 24.

High voltage dc power supply 40, having a voltage across its output terminals in the range of several thousand volts, has its positive and negative output terminals connected between backing roll 12 and electrically conductive nozzle 22 through paths 42 and 44, respectively. Voltage from power supply 40 is coupled to coating material 26 through said electrically conductive coating applicator nozzle 22. If nozzle 22 was not electrically conductive, voltage from power supply 40 could be coupled to coating material 26 by means of an electrode (not shown) projecting through applicator 16 and into contact with said coating material 26. When power supply 40 is so connected between backing roll 12 and applicator nozzle 22, electrostatic field 46 is established in gap 18 between coating material 26 at edge 34 of dielectric tube 24 and the cylindrical outer surface of conductive backing roll 12. When web 48 is passed over said cylindrical surface of web-supporting backing roll 12 through gap 18, electrostatic field 46 is also established between coating material 26 at said edge 34 and the surface of web 48 immediately adjacent gap 18.

Figure 2B:
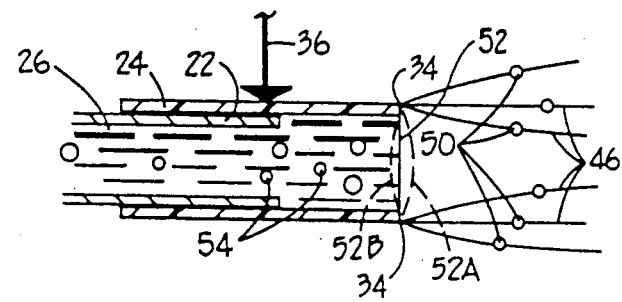
FIG. 2B is the same view as that in FIG. 2A additionally showing changes in the shape of the coating material surface at the applicator output that might occur due to entrained gas bubbles and/or changes in coating material pressure levels.

With continued reference to FIGS. 1 and 2A of the drawings, when electrostatic field 46 of predetermined intensity is established between coating material 26 at edge 34 of dielectric tube 24 and the adjacent surface of moving web 48, minute particles 50 are atomized or extracted from coating material 26 at edge 34 by forces associated with electrostatic field 46. These minute coating material particles 50 formed by electrostatic field 46 are subsequently transported to and uniformly deposited on the adjacent surface of moving web 48 by the same electrostatic field 46 in an extremely thin layer. The rate of coating material 26 flow through the orifice in coating applicator nozzle 22 and dielectric tube 24 is made equal to the rate of coating material particle 50 extraction by electrostatic field 46 from material 26 at edge 34 of dielectric tube 24. The rate of coating material 26 flow from edge 34 at the output of dielectric tube 24 onto the adjacent surface of web 48 is primarily dependent upon the intensity of electrostatic field 46. It should be noted that coating thickness is also dependent upon the rate of web 48 movement past the output of dielectric tube 24. Changes in the intensity of electrostatic field 46 will cause changes in coating material flow rate and therefore changes in thickness uniformity of coating material 26 subsequently deposited on moving web 48 by electrostatic field 46.

Coating material 26 at edge 34 of dielectric tube 24 can be thought of as the end of an electrode having a particular radius of curvature. As is well known, changes in this radius of curvature can produce changes in an electrostatic field in the vicinity thereof for any selected electrostatic field generating electrode voltage. If the electrode voltage is held constant, an increase in the radius of curvature at the end of the electrode will produce a decrease in electrostatic field intensity, whereas a decrease in the radius of curvature at the end of the same electrode will produce a corresponding increase in electrostatic field intensity. Changes in this radius of curvature can be produced by a number of different factors. However, all of these factors are related to the rate at which coating material 26 flows to edge 34 of dielectric tube 24. An increase in the flow rate of coating material 26 to edge 34 will produce an increase in the radius of curvature of coating material 26 at edge 34 whereas a decrease in the flow rate of coating material 26 to edge 34 will produce a decrease in the radius of curvature of coating material 26 at said edge 34. Edge 34 at the free end of tube 24 forms coating material 26 into what can be considered a relatively small radius of curvature electrode thereby enabling power supply 40 to generate the required electrostatic field intensity in the vicinity of said edge 34 at a minimum power supply 40 voltage level. Also, edge 34 enhances the control of electrostatic field 46 during the coating process by forcing said field to emanate from a well-defined location (edge 34) on applicator 16.

With additional reference to FIG. 2B of the drawings, one factor that might effect the rate of coating material 26 flow to edge 34 of dielectric tube 24 is the actual electrostatic atomization of coating material 26 by electrostatic field 46. As small particles are extracted or atomized from coating material 26 at edge 34, small voids are created and then filled, thereby causing changes in the radius of curvature of coating material 26 at edge 34 and corresponding changes in the intensity of the electrostatic field producing such particle atomization. Another factor might be the pressure generated by the coating material pressurizing pump 28. As shown in FIG. 2B, pump pressure variations would cause surface 52 of coating material 26 to vary between surface position 52A and surface position 52B causing electrostatic field altering changes to the radius of curvature of coating material 26 at edge 34 of tube 24. While it is possible to limit variations in the output pressure of a mechanical pump with a conventional pressure regulator, all such arrangements are incapable of limiting pump pressure variations below some finite coating material flow rate altering level. Yet another factor might be entrained air in the coating material such as bubbles 54 in coating material 26 within nozzle 22 and tube 24 as shown in drawing FIG. 2B. When bubbles 54 reach surface 52 of coating material 26, the rate of coating material 26 flow to edge 34 is temporarily altered, thereby causing a temporary change in the intensity of electrostatic field 46. However, in addition to its primary function of insuring that coating material 26 flows to outer edge 34 of tube 24 during the entire coating process, a secondary aspect of vibrator 32 is its ability to either neutralize or bring to within acceptable limits all of the factors noted above having a detrimental effect on the rate of flow of coating material 26 to edge 34 of tube 24 whenever said tube 24 is vibrated by vibrator 32 in the above-described manner. In other words, the overall function of mechanical vibrator 32 is to stabilize the flow rate and the surface shape of coating material 26 at the output end of tube 24.

Extremely slow coating material movement through a relatively intense electrostatic field such as the movement of coating material 26 from tube 24 to an adjacent surface of web 48 through electrostatic field 46 as shown in drawing FIG. 1 causes moisture to be removed from the surface of said coating material 26 at the output end of tube 24. Removal of moisture from coating material 26 in this manner would eventually cause a thickening of coating material 26 and a subsequent reduction or even total cessation of coating material 26 flow to edge 34 of tube 24 which, in turn, would change the thickness of a layer of coating material deposited on a surface of said web 48 by electrostatic field 46. Depending upon such factors as coating material volatility and flow rate and the intensity of the coating material depositing electrostatic field, flow altering moisture removal could take place in a matter of a few minutes. The greater the coating material volatility or evaporation rate and/or the lower the coating material flow rate, for example, the greater will be the rate of coating material drying for any particular level of electrostatic field intensity. Acetone, for example, which has a high volatility or evaporation rate, will dry out at a much faster rate than water when both fluids are exposed to the same level of electrostatic field intensity. However, when tube 24 is vibrated by mechanical vibrator 32, thereby vibrating coating material 26 at the output of said tube 24, flow rate altering dryout of coating material 26 by electrostatic field 46 is precluded. By constantly vibrating coating material 26 at the end of tube 24 during the entire coating process, coagulation of the solids within coating material 26 at the output end of said tube 24 is thereby prevented.

As described above, and as shown in FIG. 1 of the drawings, mechanical vibrator 32 is electrically powered with its operating power being derived from separate dc power supply 38. In addition, and as also described above, the output terminals of electrostatic field generating high voltage dc power supply 40 are connected between conductive backing roll 12 and conductive applicator nozzle 22 with the low potential terminal being connected to nozzle 22 through path 44 and with the high potential terminal being connected to backing roll 12 through path 42. This applicator nozzle to backing roll connection scheme is the reverse of that employed in most web coating operations utilizing electrostatic assist where the high potential terminal is normally connected to the coating applicator and the low potential terminal is normally connected to the conductive backing roll. The reason for reversing the output terminals of electrostatic field generating power supply 40 from that normally employed in prior arrangements is so that applicator nozzle 22 and the housing of vibrator 32 mechanically coupled thereto can be maintained at the same electrical potential (ground). By maintaining these components at the same electrical potential, electrically powered mechanical vibrator 32 does not have to be specially designed to, for example, include additional electrical insulation in order to withstand what might otherwise be a substantial potential difference between applicator nozzle 22 and said mechanical vibrator 32.

In one particular coating operation employing coating apparatus 10, a 2% solids solution having a viscosity of 2 centipoise (cps) and an electrical conductivity of $10^{-4}$ mhos per centimeter was coated on a 6 inch wide polyester web having an electrical resistivity of $10^{13}$ ohms per square, spaced 5 inches from the free end of tube 24. The web was moving at 10 ft/min and the electrostatic field generating voltage between applicator nozzle 22 and web-supporting backing roll 12 was 40,000 volts dc. Under these particular conditions, a uniform coating of less than 0.1 micron in thickness was deposited on a surface of said polyester web by coating apparatus 10.

An unexpected advantage derived from the coating apparatus of the present invention, such as coating apparatus 10 shown in drawing FIG. 1, is its ability to coat relatively high dielectric materials with lower conductivity coatings than heretofore possible. In prior coating apparatus employing an electrostatic field to deposit coating material on the surface of a substrate, the highest resistivity material that could be coated was one having a resistivity of approximately $10^4$ ohms per square and the conductivity of any coating material electrostatically deposited on such material had to be between $10^{-6}$ and $10^{-8}$ mhos per centimeter. Higher resistivity webs could not be electrostatically coated and coating materials having a conductivity greater than $10^{-6}$ mhos per centimeter had substances added to them in order to lower their conductivities for substrate coating purposes. The coating apparatus of the present invention is capable of electrostatically coating a substrate having a resistivity of up to and including $10^{13}$ ohms per square with coating material having a conductivity as low as $10^{-4}$ mhos per centimeter.

Coating applicator 16 is described herein as having an output formed of dielectric material. Having the applicator opening formed of a dielectric material is a major reason why coating apparatus 10 is capable of depositing extremely thin coating material layers. The present apparatus is capable of applying a layer of coating material to a conductive substrate that is substantially thinner than that possible with, for example, the coating apparatus described in the above-mentioned RANSBURG patent. However, this RANSBURG coating apparatus could apply substantially thinner coatings if the larger opening or the output end of the spinning conical body employed in the coating applicator of RANSBURG was formed of dielectric material. Claims of the present application are intended to encompass such an embodiment.

Coating apparatus 10 described above and illustrated in drawing FIG. 1 is primarily employed in coating applications where extremely thin (less than 0.1 micron) coatings are required. Coating apparatus 10 is considerably less effective, however, for dielectric substrate coating applications where the required coating thickness is significantly greater than 0.1 micron. In coating apparatus 10 when coating material 26 is atomized, the atomized particles maintain the same polarity as the unatomized portion of coating material 26 within coating applicator 16 which, in this particular instance, is negative. These negatively charged atomized particles are attracted toward an adjacent surface of moving web 48 by positively charged backing roll 12. The initially atomized coating material particles are transported to and are uniformly deposited on a surface of web 48 by electrostatic field 46. These initially deposited particles maintain their negative charge for a considerable period of time after being deposited on said web 48. This slow rate of charge dissipation is due to the excellent insulative qualities of dielectric web 48 and the normally dry air surrounding web 48. No such delay in charge dissipation would occur if the substrate to be coated was electrically conductive. This particular phenomenon is acceptable for very thin (less than 0.1 micron) dielectric substrate coating applications. However, when an attempt is made to apply significantly thicker coatings to a dielectric substrate, the subsequently transported negative coating material particles are repelled by the initially deposited coating material particles because they have the same negative charge polarity. The apparatus illustrated in drawing FIG. 3 is able to overcome this coating material thickness limitation problem by neutralizing the electrical charge on the coating material particles as they are deposited on dielectric web 48, before they can repel or interfere with the subsequently deposited coating material particles.

Figure 3:
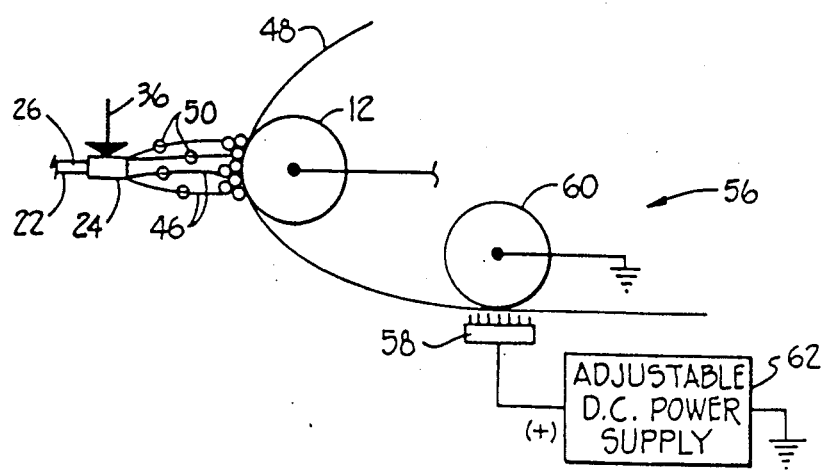
FIG. 3 shows a portion of the web coating arrangement of drawing FIG. 1 and means for electrostatically charging a dielectric web prior to depositing coating material on a web surface.

FIG. 3 depicts a portion of the dielectric substrate coating apparatus illustrated in drawing FIG. 1. As shown in FIG. 3, dielectric web 48 is movably supported in a spaced relation from the free end of dielectric tube 24 by electrically conductive backing roll 12 as it is in drawing FIG. 1. Applicator 16, (FIG. 1) supplies coating material 26 to the free end of tube 24 and vibrator 32 (FIG. 1) coupled to said tube 24 through path 36 vibrates tube 24 in the same way that these components provide these functions in the coating apparatus shown in drawing FIG. 1. Similarly, electrostatic field 46 causes the formation of coating material particles 50 and then transports these particles toward an adjacent surface of moving web 48 in the same manner that the same electrostatic field 46 performs these same functions in the coating apparatus of FIG. 1. However, before web 48 is moved into the gap between the end of tube 24 and electrically conductive backing roll 12 for web coating purposes, a dipole type electrostatic charge is placed on web 48 by dielectric web charging apparatus 56. Dielectric web charging apparatus 56 operates in the same manner as the dielectric web charging apparatus described in U.S. Pat. No. 4,457,256 issued July 3, 1984 to Kisler et al. A relatively intense electrostatic field is established between conductive bristle brush 58 and electrically conductive backing roll 60 by such charging apparatus when the output terminals of energized adjustable dc power supply 62 are connected between said brush 58 and said backing roll 60. When web 48 is passed through this intense field, a dipole-type electrostatic charge is established on said web 48. The polarity of this charge is positive due to the positive terminal of power supply 62 being connected to conductive bristle brush 58. The magnitude of the electrostatic charge on web 48 is determined by the magnitude of the output voltage of dc power supply 62. In the coating operation of FIG. 3, the magnitude of the positive dipole charge established on web 48 is empirically determined and is of a magnitude that is sufficient to neutralize the negative electrostatic charge on each of the coating material particles 50 that must be deposited on web 48 in order to obtain the required web coating thickness. Therefore, as each coating material particle 50 is uniformly deposited on web 48, it is neutralized by the electrostatic charge established on said web 48 by dielectric web charging apparatus 56, before the initially deposited coating material 50 particles can repel or interfere with subsequently deposited coating material 50 particles needed to form the web coating layer.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. Apparatus for applying a uniform thickness layer of coating material to a substrate comprising:
    a coating applicator adapted for coupling to a source of coating material, with said applicator having an opening therein formed of dielectric material;
    means for pressurizing coating material within said coating applicator to a pressure level that will maintain a substantially constant volume of coating material at the output of said dielectric applicator opening;
    means for supporting a substrate in a spaced relation from said applicator opening output to thereby form a coating gap between said output and the substrate;
    means for applying a vibratory force to said applicator to thereby cause coating material flow to a selected portion of said applicator opening output and to stabilize the surface shape of coating material at said selected output portion;
    means for establishing an electrostatic field in said coating gap between coating material at said applicator opening output and the substrate spaced therefrom to electrostatically atomize the coating material at said applicator opening output, thereby extracting minute coating material particles from coating material at said applicator opening output, and subsequently transport them to and deposit them on the substrate; and
    means for moving the substrate through said coating gap, at a constant rate, whereby a relatively thin, uniform thickness layer of said electrostatically atomized coating material is deposited on the substrate.

2. The apparatus of claim 1 wherein said means for applying a vibratory force includes means coupled to said applicator for vibrating coating material at the output of said applicator opening, at a selected magnitude and frequency, in a predetermined direction.

3. The apparatus of claim 2, wherein said applicator opening is a tube formed of a dielectric material having a longitudinal axis in the principal direction of coating material flow through the center thereof, with the output end of said tube being truncated at a predetermined angle with respect to said longitudinal axis.

4. The apparatus of claim 3, wherein the output end of said tube is truncated at a right angle with respect to said longitudinal axis.

5. The apparatus of claim 3, wherein said dielectric tube is circular in cross-section, has an inside diameter of 0.30 inch, a wall thickness of 0.10 inch and is formed of polytetrafluorethylene.

6. The apparatus of claim 3, wherein said means for applying a vibratory force is an electromechanical vibrator mechanically coupled to said dielectric tube.

7. The apparatus of claim 6, wherein the direction of the vibration forces generated by said electromechanical vibrator is at a right angle with respect to said longitudinal axis.

8. The apparatus of claim 6, wherein the vibratory force produced by said electromechanical vibrator causes coating material to flow to an edge of said tube formed by the truncated tube end and the outer tubular surface thereof and the electrostatic field in said coating gap is established between coating material at said tube edge and the said substrate spaced therefrom.

9. The apparatus of claim 6, wherein a portion of said applicator is electrically conductive, said means for supporting a substrate is a rotatably mounted electrically conductive backing roll, said means for establishing an electrostatic field includes a first dc power source having positive and negative output terminals with the positive terminal being coupled to said backing roll and said negative terminal being coupled to the said electrically conductive portion of said applicator, said electromechanical vibrator includes an electrically conductive housing and positive and negative electrical power input terminals, said electromechanical vibrator is powered by a second dc power source having positive and negative power output terminals, said positive vibrator input terminal is electrically coupled to the positive output terminal of said second dc power source, said negative vibrator terminal is electrically coupled to the negative output terminal of said second dc power source, to said vibrator housing and to the said electrically conductive portion of said coating applicator.

10. The apparatus of claim 1, wherein said substrate is a dielectric, said coating material particles deposited on said dielectric substrate have electrostatic charges established thereon by the electrostatic field in said coating gap and said apparatus further comprises means for applying a dipole-type electrostatic charge on said substrate at a location remote from said coating gap having a magnitude and polarity sufficient to neutralize electrostatic charges on the deposited coating material particles as said charged substrate is moved into said coating gap for substrate coating purposes.

11. Apparatus for applying a uniform thickness layer of coating material to a dielectric substrate, comprising:
a coating applicator adapted for coupling to a source of coating material, said applicator having an opening therein formed of a dielectric tube having a longitudinal axis in the principal direction of coating material flow through the center thereof with the output end of said tube being truncated at a predetermined angle with respect to said longitudinal axis;
means for pressurizing coating material within said coating applicator to a pressure level that will maintain a substantially constant volume of coating material at said truncated end of said dielectric tube;
means for movably supporting a dielectric substrate in a spaced relation from said applicator opening output to thereby form a coating gap between said output and the substrate;
means coupled to said applicator for vibrating coating material at said applicator opening output, at a selected magnitude and frequency, in a direction that is at an angle with respect to said longitudinal tube axis to thereby cause coating material flow to a selected portion of said applicator opening output and to stabilize the surface shape of coating material at said selected output portion;
means for establishing an electrostatic field in said coating gap between coating material at the truncated end of said applicator output opening and the dielectric substrate spaced therefrom to electrostatically atomize the coating material at said output and subsequently transport it to and deposit it on said dielectric substrate; and
means for moving the dielectric substrate through said coating gap, at a constant rate, whereby a thin, uniform thickness layer of said electrostatically atomized coating material is deposited on the moving substrate.

12. A method of applying a uniform thickness layer of coating material to a substrate comprising the steps of:
forming a coating applicator adapted for coupling to a source of coating material, with said applicator having an opening therein composed of dielectric material;
pressurizing coating material within said coating applicator to a pressure level that will maintain a substantially constant volume of coating material at the output of said applicator opening;
supporting a substrate in a spaced relation from said applicator opening to thereby form a coating gap between said output and the substrate;
applying a vibratory force to said applicator to thereby cause coating material flow to a selected portion of said applicator opening output and to stabilize the surface shape of coating material at said selected output portion;
establishing an electrostatic field in said coating gap between coating material at said applicator opening output and the substrate spaced therefrom to electrostatically atomize the coating material at said applicator output, to thereby extract minute coating material particles from coating material at said applicator opening output, and subsequently transport them to and deposit them on the substrate; and
moving the substrate through said coating gap, at a constant rate, whereby a thin, uniform thickness layer of said electrostatically atomized coating material is deposited on the substrate.

13. The method of applying a uniform thickness layer of coating material to a substrate in accordance with claim 12, in which said applicator opening is a tube formed of a dielectric material having a longitudinal axis in the principal direction of coating material flow through the center thereof and wherein said vibratory force is applied by a mechanical vibrator in a direction that is at a right angle with respect to said longitudinal axis.

14. The method of applying a uniform thickness layer of coating material to a dielectric substrate in accordance with claim 12, wherein the said coating material particles deposited on said dielectric substrate have electrostatic charges established thereon by the electrostatic field in said coating gap and said method further comprises the step of applying a dipole-type electrostatic charge on said substrate at a location remote from said coating gap having a magnitude and polarity sufficient to neutralize electrostatic charges on the deposited coating material particles as said charged substrate is moved into said coating gap for substrate coating purposes.

* * * * *